US006922896B2

(12) United States Patent
Choi

(10) Patent No.: US 6,922,896 B2
(45) Date of Patent: Aug. 2, 2005

(54) METHOD FOR FABRICATING SLAT-SCREEN ASSEMBLY

(76) Inventor: Ying-Kit Choi, 7Fl-6, No. 303, Tun Hwa North Road, Taipei (TW)

( * ) Notice: Subject to any disclaimer, the term of this patent is extended or adjusted under 35 U.S.C. 154(b) by 318 days.

(21) Appl. No.: 10/383,561

(22) Filed: Mar. 10, 2003

(65) Prior Publication Data

US 2004/0034985 A1 Feb. 26, 2004

(30) Foreign Application Priority Data

Aug. 20, 2002 (TW) ....................................... 91118740 A

(51) Int. Cl.[7] ............................ B23P 15/12; E04C 2/22

(52) U.S. Cl. ............................... 29/897.15; 29/897.31; 52/664

(58) Field of Search ........................... 29/896.6, 896.61, 29/897.15, 897.31, 433, 525.02; 209/395, 405, 408; 52/656.9, 666, 665, 667, 664, 669, 473

(56) References Cited

U.S. PATENT DOCUMENTS 469,520 A * 2/1892 Hale ........................... 52/669
846,291 A * 3/1907 Emerson ...................... 52/663
1,723,311 A * 8/1929 Stine ........................ 29/897.15
2,967,620 A * 1/1961 Bixby ..................... 29/897.15
3,381,355 A * 5/1968 Bixby ..................... 29/897.15
3,901,801 A * 8/1975 Bixby ........................ 209/395
4,037,383 A * 7/1977 Diebold et al. ............... 52/664
4,522,009 A * 6/1985 Fingerson .................... 52/667
4,727,704 A * 3/1988 Carlton ........................ 52/667
4,897,299 A * 1/1990 Kawachi et al. .............. 52/664
4,928,471 A * 5/1990 Bartley ........................ 52/664
5,133,123 A * 7/1992 Rigg ....................... 29/897.31
5,477,654 A * 12/1995 Weelink ...................... 52/664

* cited by examiner

*Primary Examiner*—David P. Bryant
(74) *Attorney, Agent, or Firm*—Birch, Stewart, Kolasch & Birch, LLP

(57) ABSTRACT

A method for fabricating a slat-screen assembly is provided, wherein the slat-screen assembly is formed by at least one slat member, at least one spacer member and an axial member that penetrates through the slat member and the spacer member, allowing a plurality of slat members and spacer members to be mounted to the axial member with adjacent slat members being spaced apart from each other by a spacer member. The slat member can be flexibly fabricated by a construction material such as metal, plastic, wood, glass, stone, etc. The spacer member can be desirably processed into different shapes as long as it provides the function for spacing adjacent slat members apart. With flexible combination and arrangement of the slat member, spacer member and axial member, a variety of slat-screen assemblies can be fabricated with desirable shapes, materials and mechanical strengths.

8 Claims, 8 Drawing Sheets

METHOD FOR FABRICATING SLAT-SCREEN ASSEMBLY

FIELD OF THE INVENTION

The present invention relates to methods for fabricating slat-screen assemblies, and more particularly, to a method for fabricating a slat-screen assembly by which a cylinder-shaped axial member, a slat member and a spacer member are flexibly assembled to form slat screens of various shapes and materials.

BACKGROUND OF THE INVENTION

Current slat-screen assemblies can be fabricated generally by three types of methods. The first method is applied to manufacture of wood slat screens. Referring to FIG. 1, a vertical wood strip 101 is formed with a plurality of first recesses 103, and a horizontal wood strip 102 is formed with a second recess 104, allowing the second recess 104 to be engaged with a corresponding one of the first recesses 103 by means of an adhesive (not shown) applied in the recesses 103, 104 or by means of nails (not shown), so as to fix vertical wood strip 101 and the horizontal wood strip 102 together to form a slat-screen assembly. However, due to unidirectional adhesion between the vertical and horizontal wood strips 101, 102, engagement of the recesses 103, 104 may be easily damaged by an external force, and also formation of the recesses 103, 104 is labor-consuming to implement.

The second method is used for fabricating metal slat screens. Referring to FIG. 2, a vertical metal strip 201 is formed with a plurality of first grooves 203, and a horizontal metal strip 202 is formed with a plurality of second grooves 204, allowing the corresponding first and second grooves 203, 204 to be coupled to each other by means of solder 205 to form a slat-screen assembly, which is beneficially has relatively great mechanical strength. However, this method still causes significant drawbacks, such as complicated fabrication processes, roughness in solder application and difficulty in solder planarization. Moreover, a surface anodizing process is cost-ineffectively performed after fabrication of the slat-screen assembly; for an aluminum-made screen assembly, anodizing may not be formed uniformly due to property change of the aluminum material during soldering.

The third method involves screw fastening. Referring to FIG. 3, a vertical aluminum member 301 having a vertical fixing plate 301' is formed with a first indent 303, and a horizontal aluminum member 302 having a horizontal fixing plate 302' is formed with a second indent 304. Since recessed depths D1', D2' of the first and second indents 303, 304 respectively are smaller than depths D1, D2 of positions where the fixing plates 301', 302' are located, therefore, an aperture can be formed on each of the vertical and horizontal fixing plates 301', 302' corresponding in position to the first or second indent 303, 304. When the first indent 303 is engaged with the second indent 304, a screw 305 can penetrate through the aperture of the vertical fixing plate 301', the first and second indents 303, 304 and the aperture of the horizontal fixing plate 302', to thereby fix the vertical and horizontal members 301, 302 together and form a slat-screen assembly on which a cover 306 is mounted to cover the screw 305, as shown in FIG. 4. This slat-screen assembly has a desirable appearance and mechanical strength, and each of the vertical and horizontal members 301 and 302 can be anodized or painted before assembly. However, this assembling method is complex and time-ineffective to perform, and the cover 306 may drop off during movement of the slat-screen assembly. Moreover, seams 401, 402 are respectively left at junctions between the vertical member 301 with the horizontal member 302 and the cover 306, which would degrade the appearance of the slat-screen assembly; further, the slat-screen assembly can not be flexibly or variously shaped.

SUMMARY OF THE INVENTION

A primary objective of the present invention is to provide a method for fabricating a slat-screen assembly, whereby horizontal and vertical members are strongly assembled and flexibly arranged to form a slat-screen assembly of various shapes, materials and mechanical strengths according to practical requirements.

In accordance with the above and other objectives, the invention provides a method for fabricating a slat-screen assembly, comprising the steps of: preparing an axial member formed with at least one groove thereon; preparing a spacer member formed with at least one assembling hole penetrating through the same, wherein a periphery of the assembling hole is formed with at least one flange thereon; preparing a slat member formed with at least one through hole larger in diameter than the axial member; and inserting the axial member through the through hole of the slat member and the assembling hole of the spacer member, wherein the groove of the axial member is engaged with the flange on the spacer member. After inserting the axial member through the slat member and first spacer member, another slat member can be mounted via a through hole thereof to the axial member with the spacer member being interposed between the slat members, and then another spacer member is subsequently mounted via an assembling hole thereof to the axial member; this procedure can be repeated until a required number of the slat and spacer members being attached to the axial member to fasten both ends of the axial member with fixing means so as to form the slat-screen assembly.

By the above fabrication method, the slat member only needs to be formed with at least one through hole for accommodating the axial member; the slat member can be flexibly fabricated by a construction material such as metal, plastic, wood, glass, stone, etc. The spacer member can also be desirably processed into different shapes as long as it provides the function for spacing adjacent slat members apart from each other. With flexible combination and arrangement of the slat member, spacer member and axial member, a variety of slat-screen assemblies can be fabricated with desirable shapes, materials and mechanical strengths.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
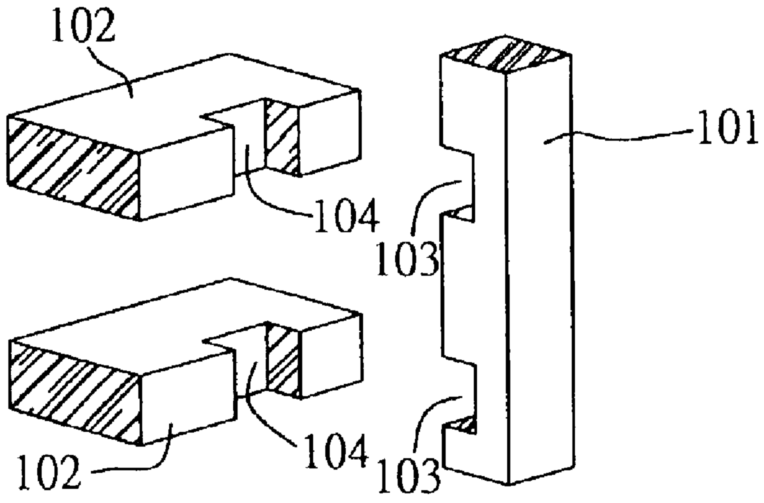
FIG. 1 (PRIOR ART)
FIG. 1 (PRIOR ART) is a schematic diagram showing assembly of conventional wood slat screens.
Figure 2:
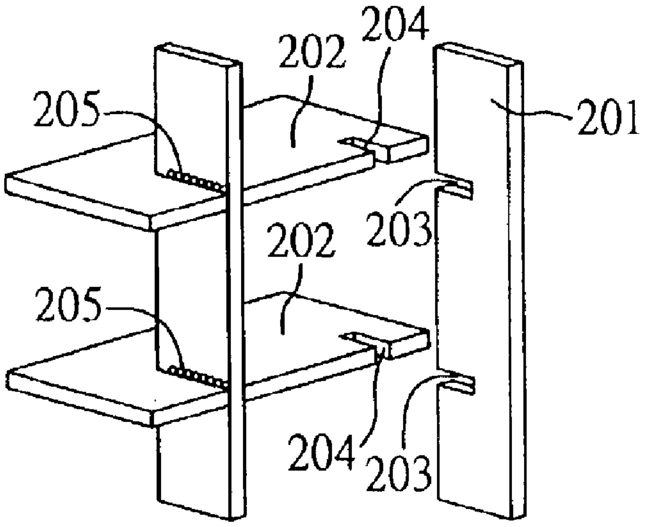
FIG. 2 (PRIOR ART)
FIG. 2 (PRIOR ART) is a schematic diagram showing assembly of conventional metal slat screens.
Figure 3:
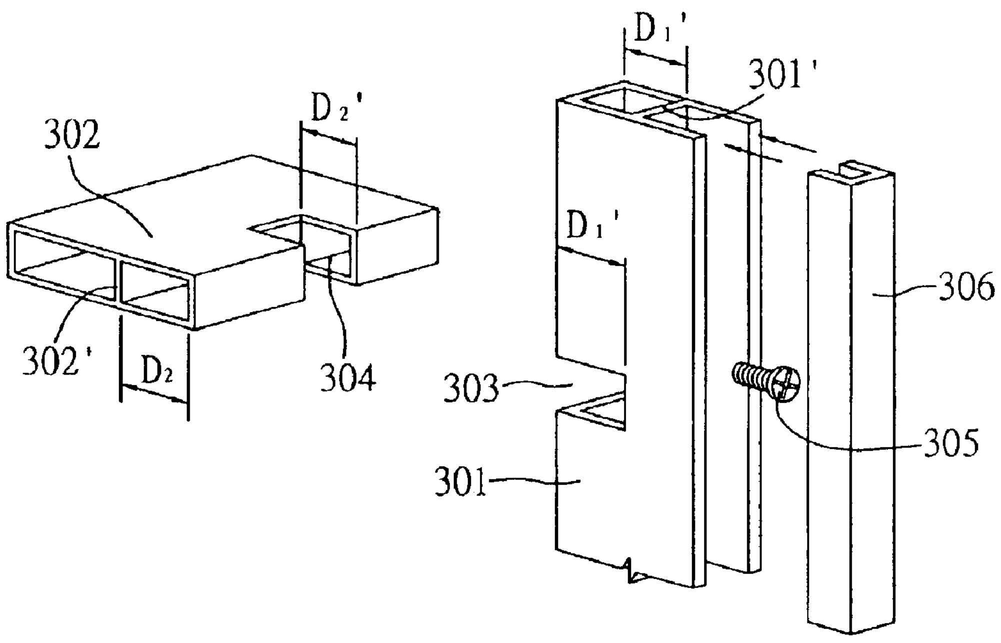
FIG. 3 (PRIOR ART)
FIG. 3 (PRIOR ART) is a schematic diagram showing assembly of conventional aluminum slat screens.
Figure 4:
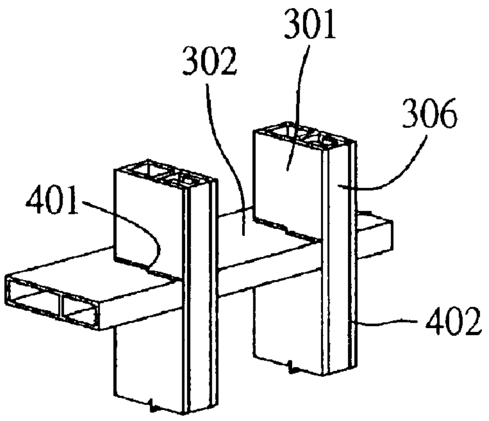
FIG. 4 (PRIOR ART)
FIG. 4 (PRIOR ART) is a schematic diagram of a fabricated slat-screen assembly of FIG. 3.
Figure 5A:
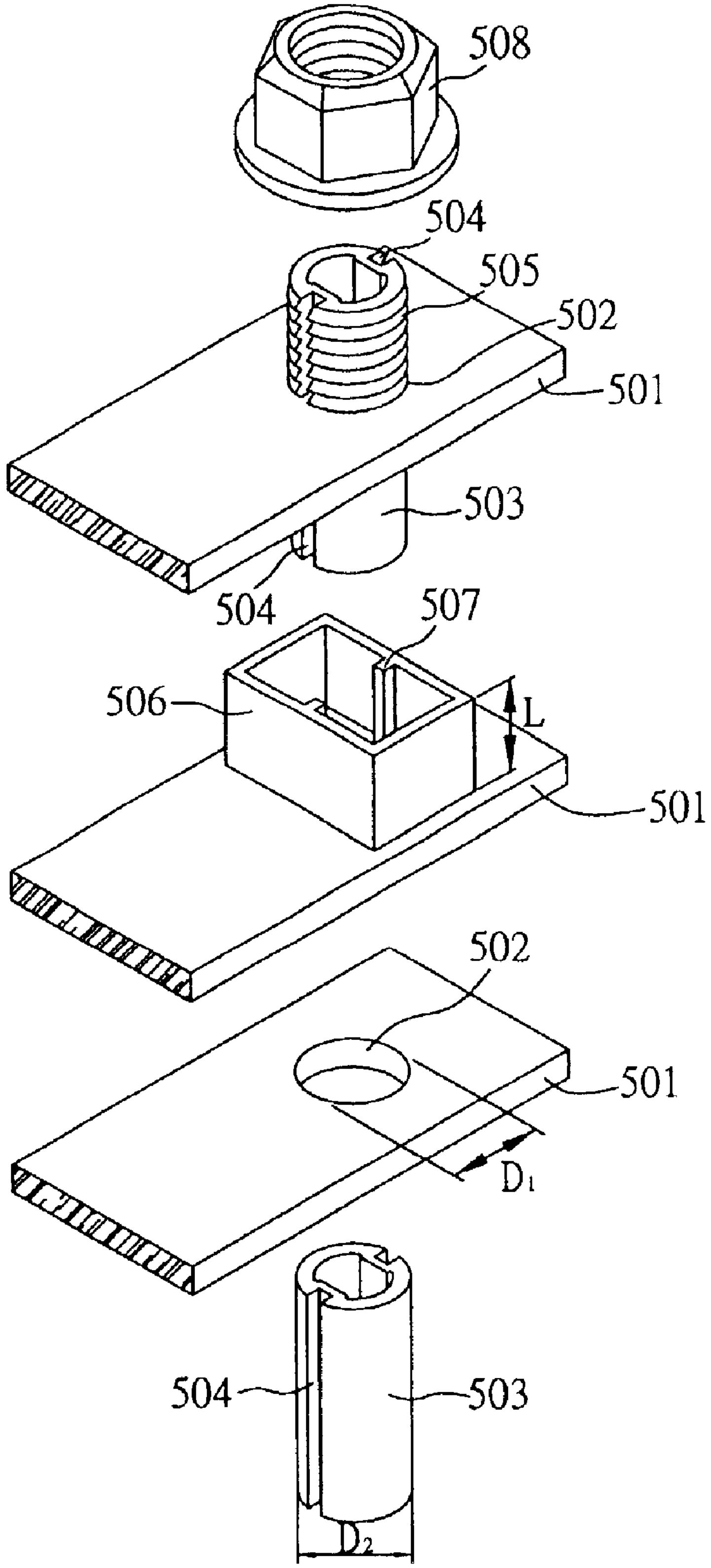
FIG. 5*a* is a schematic diagram of a slat-screen assembly according to a first embodiment of the invention.
Figure 5B:
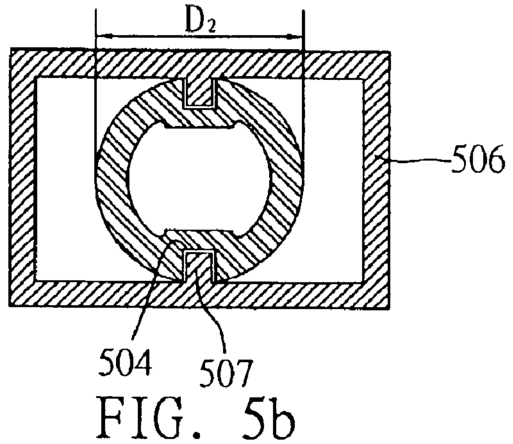
FIG. 5*b* is a cross-sectional view showing engagement between a spacer member and an axial member according to the invention.
Figure 5C:
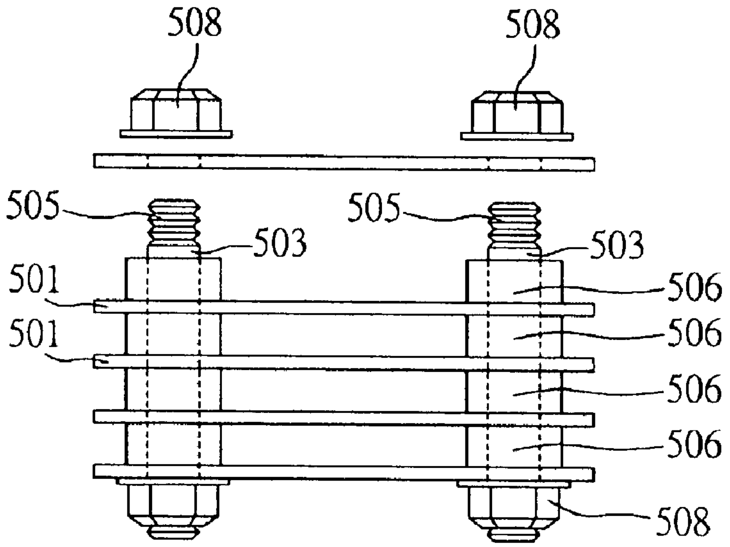
FIG. 5*c* is a side view showing fabrication of the slat-screen assembly according to the invention.
Figure 5D:
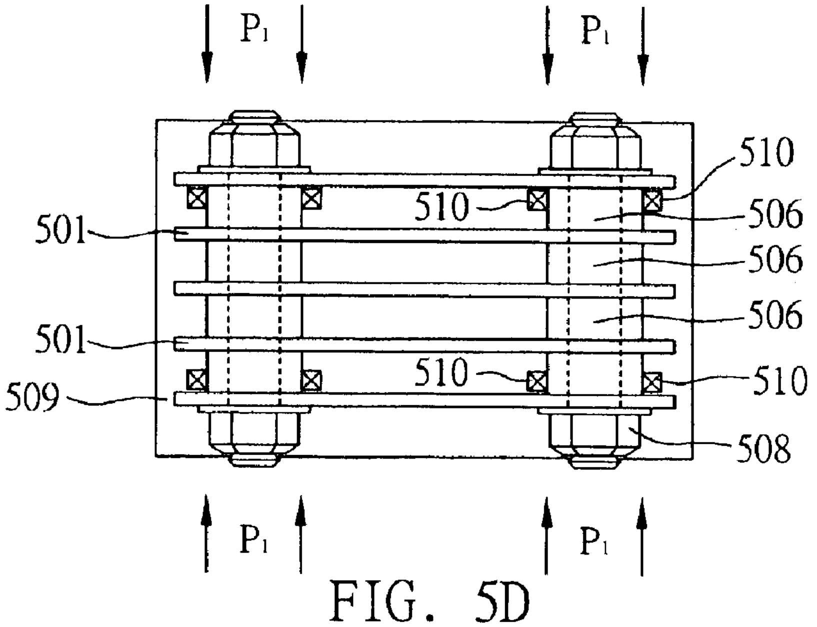
FIG. 5*d* is a side view showing the use of a platform for fabrication of the slat-screen assembly according to the invention.

FIG. 5*a* illustrates basic components of a slat-screen assembly according to the present invention. A slat member 501 is formed with a through hole 502 having a diameter D1, and can be made of construction materials such as wood, plastic, metal, and so on. An axial member 503 has a diameter D2 slight smaller than the diameter D1 of the through hole 502; as shown in FIG. 5*b*, the axial member 503 can be made of extruded metal, and is formed with one or more grooves 504 at a periphery thereof and with threads 505 at upper and lower ends thereof. A spacer member 506 having a predetermined length L is formed with one or more flanges 507 on an inner periphery thereof, and can be made of molded metal or plastic. As shown in FIGS. 5*c* and 5*d*, for fabricating the slat-screen assembly, the first step is to punch or drill a predetermined number of through holes 502 at predetermined positions of a slat member 501. Next, spacer members 506 are respectively mounted over the through holes 502 on the slat member 501. Then, an axial member 503 having a predetermined length and formed with threads 505 at ends thereof is inserted into each pair of the through hole 502 and corresponding space member 506 in a manner that, grooves 504 formed on the axial member 503 are engaged with flanges 507 formed on the spacer member 506. After a required number of the spacer members 506 and slat members 501 are assembled, the ends of the axial members 503 are screwed with washers and nuts 508 and fastened by a certain pressure (P1) provided from oil-pressure or other techniques. As shown in FIG. 5*d, a* platform 509 can be used during assemblage, which is formed with clamping members 510 for holding the spacer members 506 in position without dislocation to form a strong slat-screen assembly. Moreover, the above slat member 501 may be made of any construction materials with through holes being punched or drilled thereon. The spacer member 506 may be formed by assembling a plurality of long tubes into a bundle and cutting the bundle into segments of a predetermined length. The axial member 503 may also be similarly fabricated in a batch manner as the spacer member 506 and formed with threads at ends thereof, which can be simply accomplished by mechanical processing.

Figure 6:
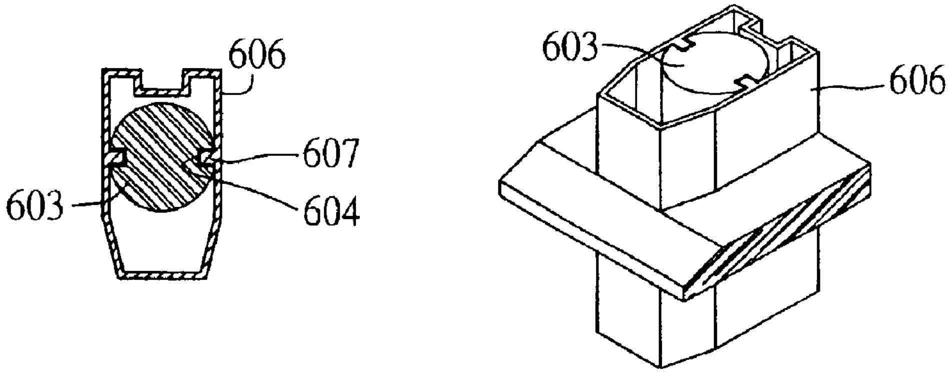
FIG. 6 is a schematic diagram of the slat-screen assembly according to a second embodiment of the invention.
Figure 7:
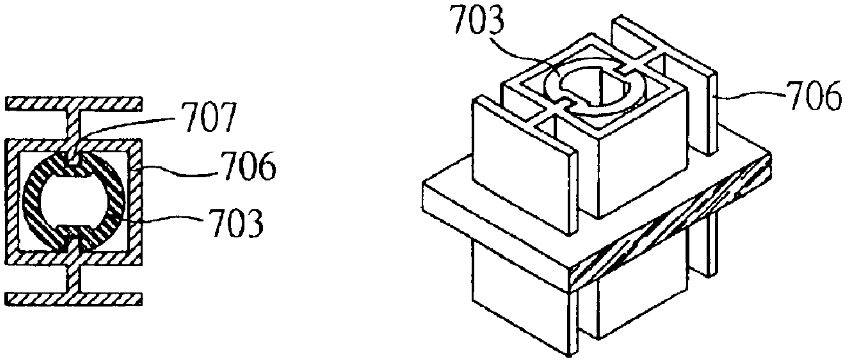
FIG. 7 is a schematic diagram of the slat-screen assembly according to a third embodiment of the invention.
Figure 8:
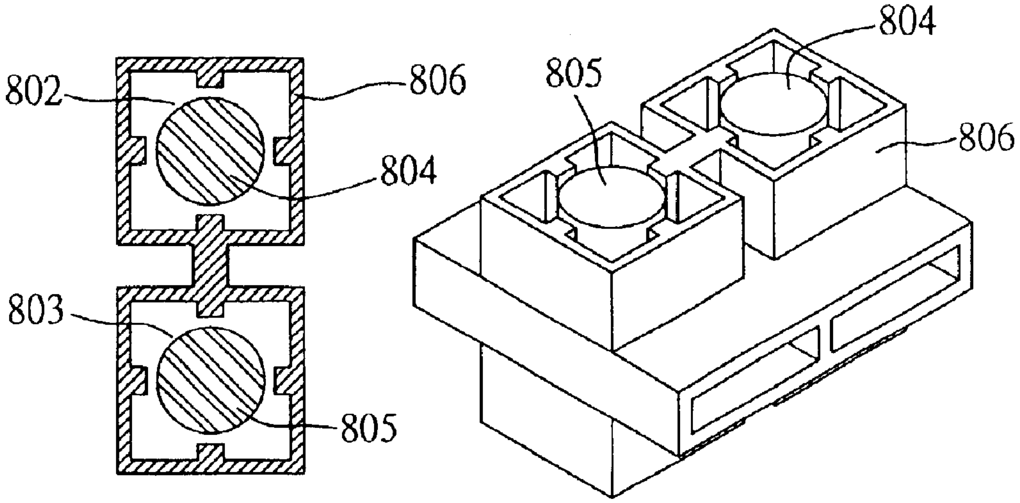
FIG. 8 is a schematic diagram of the slat-screen assembly according to a fourth embodiment of the invention.

The spacer member may be molded to form with variously shaped cross-sections according to required appearance and mechanical strength. As shown in FIGS. 6 and 7, the spacer members 606, 706 each is formed with a plurality of flanges 607, 707; alternatively, as shown in FIG. 8, the spacer member 806 may be formed with two or more assembling holes 802, 803 where the axial members 804, 805 are inserted and fastened, so as to enhance mechanical strength of the slat-screen assembly.

Referring to FIG. 6, the axial member 603 may be a solid cylinder formed with grooves 604 or aluminum-extruded to form a particularly shaped cross-section 703. Aluminum used for fabricating the axial member 603 can be a construction material such as aluminum alloy 6061-T6, which has better tensile strength and shearing strength than aluminum alloy 6063-T5 commonly used for making aluminum windows. Both aluminum alloys have similar costs and corrosion resistance and can be extruded-shaped. Surfaces of the aluminum alloy 6061-T6 would be relatively rougher and harder to be anodized; as the axial member is embedded inside the slat-screen assembly and thus would not affected the outer appearance of fabricated products.

Figure 9:
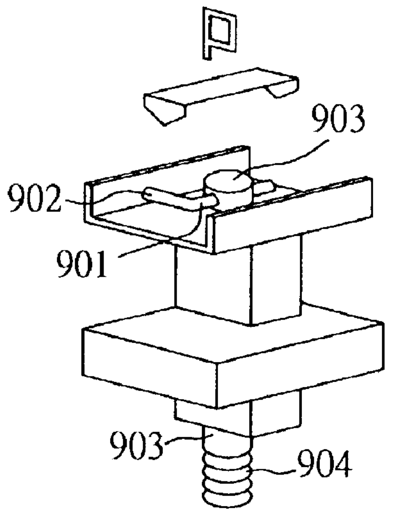
FIG. 9 is a schematic diagram of the slat-screen assembly according to a fifth embodiment of the invention.

Besides forming threads at both ends of the axial member for fastening purposes, as shown in FIG. 9, the axial member 903 may have one end being formed with a hole for inserting a plug 901 therethrough, wherein the plug 901 is provided with an anti-rotational flange 902 to prevent the axial member 903 from rotating with fastening of a nut at the other end 904 thereof.

Figure 10:
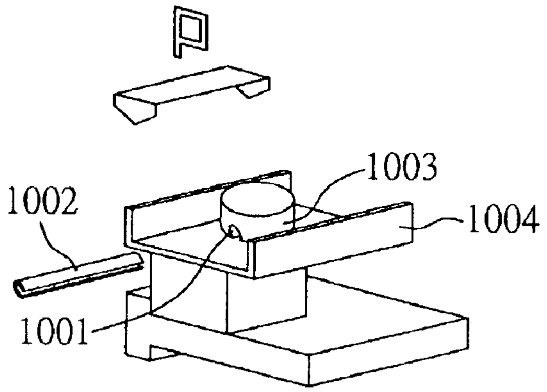
FIG. 10 is a schematic diagram of the slat-screen assembly according to a sixth embodiment of the invention.

Referring to FIG. 10, the axial member 1003 may be drilled to form at least one plug hole 1001 penetrating through each end of the axial member 1003. During assemblage, a fastening force P is applied to an outer frame 1004, allowing a plug 1002 to be inserted into the plug hole 1001 for tightly fastening the assembly. Connection between the axial member 1003 and the outer frame 1004 can be accomplished by welding the axial member 1003 to the outer frame 1004 or by other fixing or anchoring techniques. The above methods for fastening the axial member are flexibly adopted depending on work locations and processing equipment. In the case of the spacer member 806 having two or more assembling holes 802, 803 shown in FIG. 8, the axial members 804, 805 may not be necessarily formed with grooves; this is because the spacer member 806 would not move or rotate with the axial members 804, 805 being inserted through the spacer member 806 and fastened tightly for assembling the slat screens.

Figure 11:
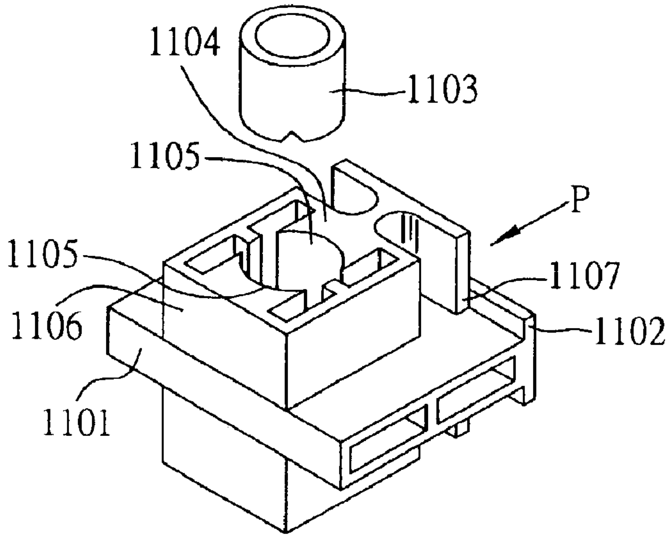
FIG. 11 is a schematic diagram of the slat-screen assembly according to a seventh embodiment of the invention.

As shown in FIG. 11, the slat member 1101 may be optionally formed with an anti-rotational flange 1102. When only a single axial member 1103 is used, the anti-rotational flange 1102 can prevent self-rotation of the spacer member 1106, and thus the axial member 1103 may not be necessarily formed with grooves, or a strong axial member 1103 such as steel bar or steel tube can be utilized. Moreover, flanges 1104 of the spacer member 1106 may be formed with anti-compressive arcs 1105 for increasing anti-compressive area between the spacer member 1106 and the axial member 1103. Such a slat-screen assembly can be adopted for manufacturing floor grids; when an upper pressure P is applied to the floor, the flanges 1104 at the lower end are partly subject to a tensile force that can be perfectly withstood by the steel-made axial member 1103, allowing an upper end 1107 of the spacer member 1106 to be under a pressure that may enhance assembly between the spacer member 1006 and the slat member 1101, thereby reducing processing time and material usage.

Figure 12:
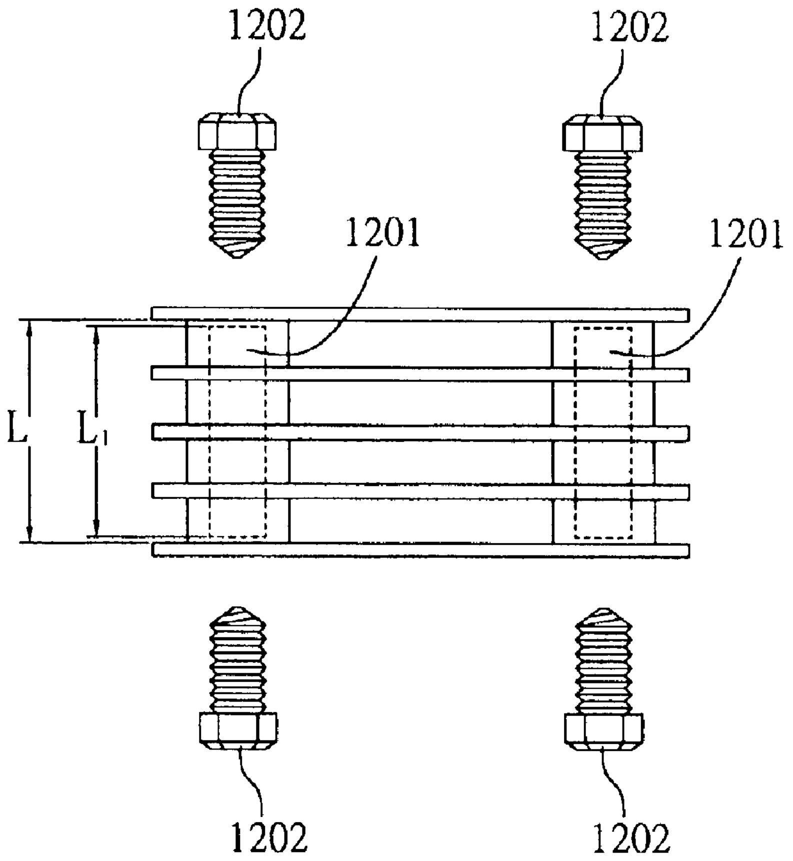
FIG. 12 is a side view of the slat-screen assembly according to the invention.
Figure 13:
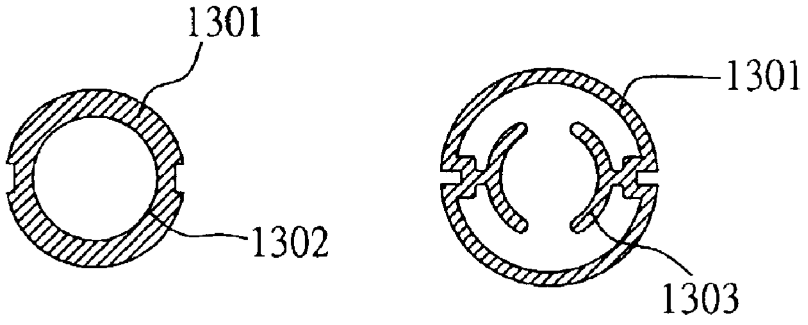
FIG. 13 is a cross-sectional view of the axial member used in the slat-screen assembly shown in FIG. 12.

Moreover, as shown in FIG. 12, the axial member 1201 may be made with a length L1 slightly shorter than a final length L thereof after being fastened with screws 1202. As shown in FIG. 13, the axial member 1301 may have its inner periphery particularly shaped to form a cross-section 1302 or 1303 that is provided with threads to be fastened with a screw. Alternatively, a self-tapping screw bolt made of steel may be used and directly screwed to the axial member 1301; as the axial member 1301 is made of aluminum weaker than the steel screw bolt, it is easy to produce tight fastening between the steel screw bolt and the axial member 1301.

Figure 14:
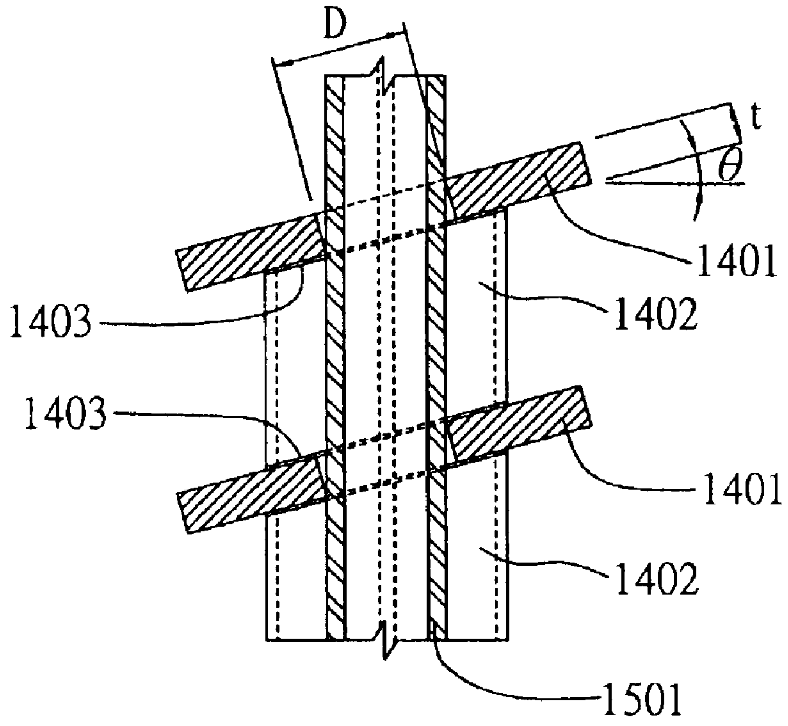
FIG. 14 is a schematic diagram of the slat-screen assembly according to an eighth embodiment of the invention.
Figure 15:
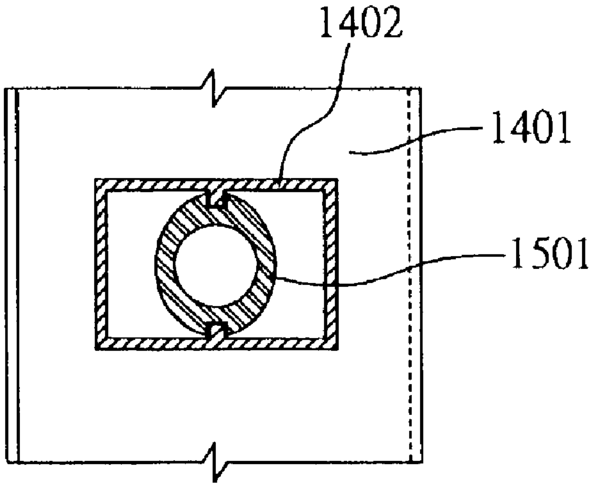
FIG. 15 is a cross-sectional view of the axial member used in the slat-screen assembly shown in FIG. 14.

Besides, as the axial member according to this invention can be molded to form variously-shaped appearances and cross-sections according to practical requirements, referring to FIG. 14, for the use with glass shutters 1401 each having a through hole of a diameter D, the spacer members 1402 are formed with gradient surfaces 1403; according to the thickness t and slope θ of the glass shutters 1401, the axial member 1501 (as shown in FIG. 15) is preferably made with its outside appearance of an elliptic shape to be easily inserted into the through holes of the glass shutters 1401.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for fabricating a slat-screen assembly, comprising the steps of:

preparing an axial member formed with at least one groove thereon;

preparing a spacer member formed with at least one assembling hole penetrating through the same, wherein a periphery of the assembling hole is formed with at least one flange thereon;

preparing a slat member formed with at least one through hole larger in diameter than the axial member, inserting the axial member through the through hole of the slat member and the assembling hole of the spacer member, wherein the groove of the axial member is engaged with the flange on the spacer member; and fastening both ends of the axial member with fixing means to form the slat-screen assembly.

2. The method of claim 1, wherein after inserting the axial member through the slat member and spacer member, at least another slat member is capable of being mounted via a through hole thereof to the axial member with the spacer member being interposed between the slat members.

3. The method of claim 2, wherein at least another spacer member is capable of being subsequently mounted via an assembling hole thereof to the axial member.

4. The method of claim 1, wherein the spacer member is formed with at least two assembling holes, and the slat member is formed with at least two through holes, allowing at least two axial members to be respectively inserted through the assembling holes of the spacer member and the through holes of the slat member to form the slat-screen assembly.

5. The method of claim 1, wherein the slat member is formed with at least one anti-rotational flange for securing the spacer member in position during fastening the axial member.

6. The method of claim 1, wherein the fixing means are selected from the group consisting of screws, nuts, bolts, welding parts, and plugs.

7. The method of claim 1, wherein the axial member is of a cylindrical shape.

8. The method of claim 1, wherein the through hole of the slat member is of a round shape.

* * * * *